United States Patent
Paturle

(10) Patent No.: US 8,731,767 B2
(45) Date of Patent: May 20, 2014

(54) METHOD FOR MONITORING THE CONDITION OF A TYRE

(75) Inventor: Antoine Paturle, Pont du Chateau (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 134 days.

(21) Appl. No.: 13/257,023

(22) PCT Filed: Mar. 18, 2010

(86) PCT No.: PCT/FR2010/050495
§ 371 (c)(1),
(2), (4) Date: Sep. 29, 2011

(87) PCT Pub. No.: WO2010/106297
PCT Pub. Date: Sep. 23, 2010

(65) Prior Publication Data
US 2012/0010776 A1    Jan. 12, 2012

(30) Foreign Application Priority Data
Mar. 19, 2009  (FR) ...................................... 09 51758

(51) Int. Cl.
*B60C 11/00* (2006.01)
*G01M 17/02* (2006.01)
(52) U.S. Cl.
USPC ......................................... 701/31.4; 701/32.1

(58) Field of Classification Search
None
See application file for complete search history.

(56) References Cited

U.S. PATENT DOCUMENTS

| 6,408,910 B1 | 6/2002 | Lagnier et al. | 152/209.17 |
| 2004/0154715 A1 | 8/2004 | Dufournier | 152/154.2 |
| 2005/0076987 A1* | 4/2005 | O'Brien et al. | 152/415 |
| 2006/0071766 A1* | 4/2006 | O'Brien et al. | 340/442 |
| 2008/0272906 A1 | 11/2008 | Breed | 340/539.11 |
| 2008/0316006 A1* | 12/2008 | Bauman et al. | 340/425.5 |

FOREIGN PATENT DOCUMENTS

| DE | 199 54 814 A1 | 5/2001 |
| DE | 10 2004 036 811 A1 | 7/2005 |
| DE | 10 2004 016 488 A1 | 10/2005 |
| EP | 1 772 293 A1 | 4/2007 |
| FR | 2 763 892 A1 | 12/1998 |
| JP | 8-207515 A | 8/1996 |

\* cited by examiner

*Primary Examiner* — Michael J Zanelli
(74) *Attorney, Agent, or Firm* — Fitzpatrick, Cella, Harper & Scinto

(57) ABSTRACT

The tyre includes a tyre tread configured so that, beyond a predetermined radial wear threshold, the tyre tread has a set of at least one wear indicator, including a so-called "sound" cavity arranged in a circumferential groove of the tyre tread. During the monitoring method, an acoustic signal that is able to include an acoustic footprint noise produced by the set during the running of the tyre on a ground beyond the predetermined threshold is detected by an acoustic sensor mounted on the vehicle, and information relating to the acoustic signal is emitted to a remote server not mounted on the motor vehicle.

17 Claims, 8 Drawing Sheets

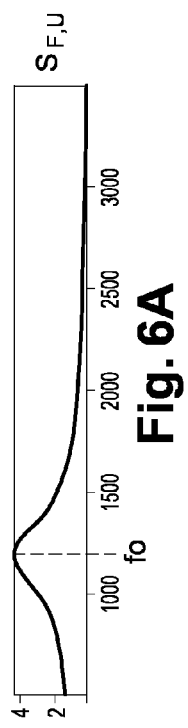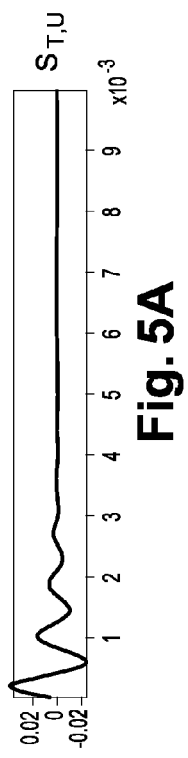
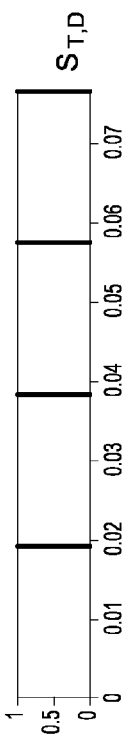
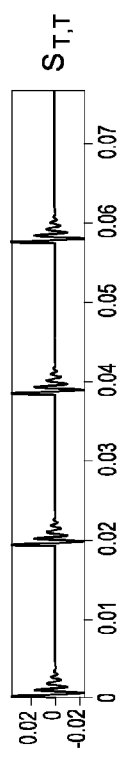
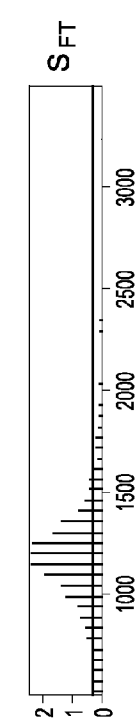
Fig. 5A Fig. 6A
Fig. 5B Fig. 6B
Fig. 5C Fig. 6C
Fig. 5D Fig. 6D
Fig. 5E Fig. 6E

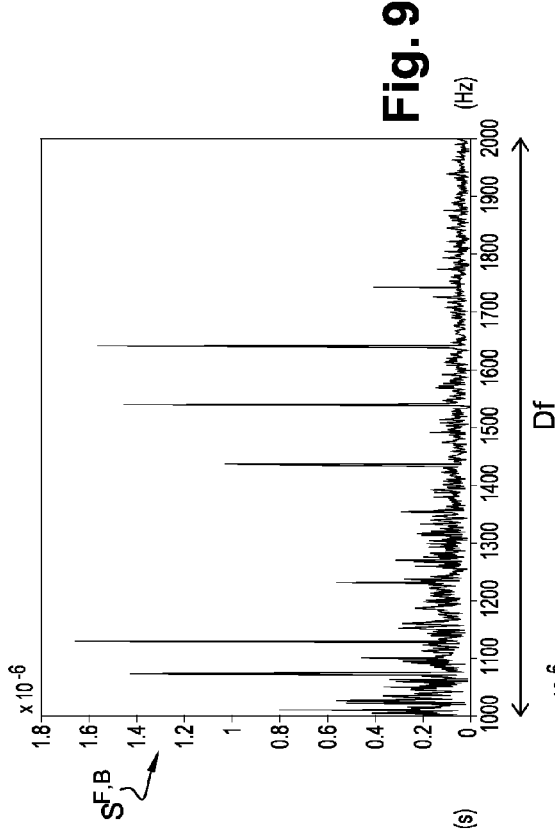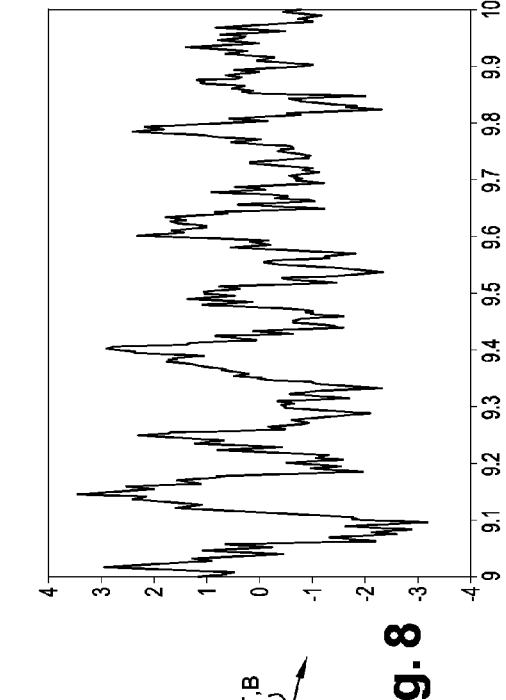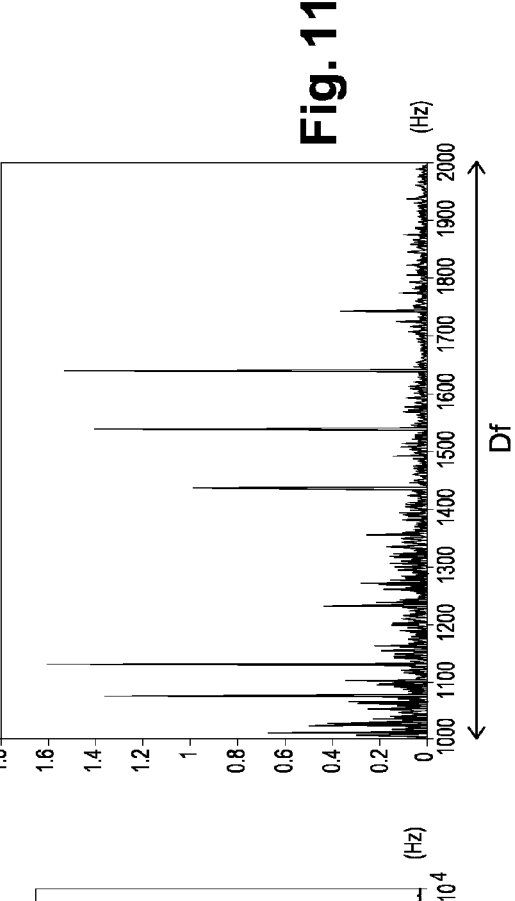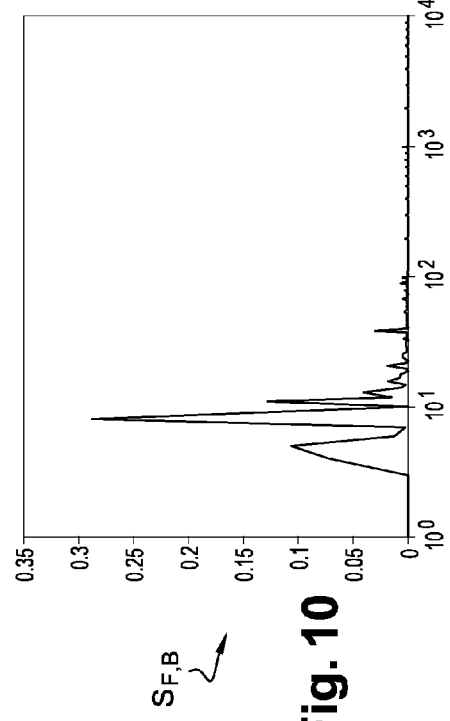

METHOD FOR MONITORING THE CONDITION OF A TYRE

FIELD OF THE INVENTION

The invention relates to the field of motor vehicle tyres and the monitoring of their condition.

For example, the invention relates to the monitoring of the state of wear or pressure of a tyre.

BACKGROUND

For obvious safety reasons, it is important for the tyre to be correctly inflated, for it not to be overloaded and for it not to be too worn. This is because pronounced wear of the tyre tread, an overload or underinflation risk causing a puncture, a blow-out, hydroplaning on a wet road, the loss of endurance, overheating, and other such problems.

To facilitate the monitoring of the condition of the tyre, it is commonly provided with condition indicators.

An example of a condition indicator for monitoring the wear consists of a rib provided at the bottom of a groove in the sculpture of the tyre and the height of which corresponds to the minimum depth of the grooves of the tyre required for correct and safe operation of the tyre. Thus, when the tyre tread of the tyre is worn and the top of the rib is flush with the outer surface of the tyre tread, this means that the minimum depth accepted for the grooves has been reached, or even exceeded. It is therefore urgent to replace the tyre for safety.

One drawback to this type of condition indicator is that it requires the vigilance of the driver of the motor vehicle and regular visual monitoring of the condition of its tyres. As it happens, many drivers omit to carry out such checks and change their tyres too late, when, during a technical inspection of the vehicle, the garage mechanic checks the state of wear of the tyres or their pressure.

BRIEF DESCRIPTION OF THE INVENTION

The aim of the invention is notably to provide a method for monitoring the condition of the tyres of a motor vehicle which does not require permanent vigilance on the part of the driver of the vehicle.

To this end, the subject of the invention is a method for monitoring at least one tyre of at least one motor vehicle comprising a tyre tread, wherein the tyre tread is configured so that, beyond a predetermined radial wear threshold, the tyre tread has a set of at least one wear indicator, comprising a so-called "sound" cavity arranged in a circumferential groove of the tyre tread, each cavity opening out radially towards the outside of the tyre and being configured so as to be sealed by the ground in a substantially leaktight manner when it passes into the area of contact of the tyre with the ground, the method comprising the following steps:

detection by an acoustic sensor mounted on the vehicle of an acoustic signal able to comprise an acoustic footprint noise produced by the set during the running of the tyre on a ground beyond the predetermined radial wear threshold, emission, to a distant server not mounted on the motor vehicle, of information relating to the acoustic signal.

Because the cavity is configured so as to be sealed by the ground in a substantially leaktight manner, the air is temporarily imprisoned when passing from the cavity into the area of contact of the tyre with the ground. Now, under the effect of the deformation of the tyre in the area of contact, this air imprisoned in the cavity is compressed and then abruptly expanded on leaving the area of contact when the tyre tread leaves the contact with the ground at the rear of the tyre and when consequently the cavity opens.

This expansion of the air lasts around a few milliseconds and results in a specific acoustic footprint noise, often called hiss or pumping noise, dependent notably on the shape and the volume of the cavity.

This characteristic noise, which occurs only when the tyre is worn beyond the threshold, thus forms a sound alert means. Thus, even if the driver does not visually and regularly inspect the surface condition of his tyres, he will be informed of the excessive wear of his tyres when, when driving, by virtue of the detection of this characteristic hiss.

The characteristic acoustic footprint noise produced by the assembly can be detected by virtue of a system comprising an acoustic sensor, notably by a microphone.

Following this detection, the invention proposes transmitting, to a remote server not mounted on the vehicle, information relating to the detected acoustic signal.

Because the condition information is available remotely, it can be viewed or processed by a person other than the driver of the vehicle. Thus, it is no longer necessary for the driver to demonstrate regular vigilance since a remote system or a third person can inform him as to the wear of his tyres at the right time.

As the cavity is arranged in the grooves, the noise emitted by each cavity is amplified compared to a cavity that would be arranged elsewhere in the tyre tread. This amplification allows for the reliable detection of the acoustic footprint noise which may be difficult to distinguish from the surrounding noise forming, with the acoustic footprint noise, the acoustic signal. The noise emitted by the assembly is also amplified by a horn formed by the tyre and the ground once the cavity has passed the area of contact. This amplification by horn effect is at its maximum when the sound cavity is preferentially arranged axially in a central part of the area of contact of the tyre.

The expression "central part of the area of contact" should be understood to mean the region of the area of contact extending axially over substantially half the width of this area of contact in nominal load and pressure conditions and centred relative to the central median plane of the tyre.

Given that this hiss effect occurs only when the air is compressed in the cavity then expanded by escaping therefrom, it is important for the cavity to be closed off in a manner that is substantially sealed by the ground when it passes into the area of contact. This is because a cavity whose top is covered by the ground but which might also comprise transversal channels in fluidic communication with the outside air would not form a sound cavity because the air that it contains could not be compressed. This is notably the case with regard to the sculptures of the tyre treads of the tyres of the state of the art which are generally formed by a network of channels making the various cavities communicate with one another and with the outside air.

Similarly, a cavity whose dimensions are too great to be able to be totally covered by the ground when it passes into the area of contact, for example a cavity whose length is greater than the length of the area of contact, could not form a sound cavity within the meaning of the invention.

A method according to the invention may also include one or more of the following characteristics.

Beyond the predetermined radial wear threshold, each indicator comprises at least one pair of first and second sound cavities and a so-called "sound" channel linking each sound cavity of the pair to one another, each first and second sound cavity being respectively arranged in a first and second circumferential groove of the tyre tread, the channel being formed in the tyre tread, each cavity of the pair and the associated channel:

opening out radially towards the outside of the tyre, being configured so as to be sealed by the ground in a substantially leaktight manner when they pass into the area of contact of the tyre with the ground.

The sound cavities may degrade the performance levels of the tyre compared to a tyre that has no such sound cavities, notably in terms of the discharging of water through the grooves. The channel linking the cavities of each pair makes it possible to compensate for this loss of performance while allowing for the detection of the wear of the tyre.

Optionally, as each first and second groove has a predetermined depth when the tyre is new, the tyre tread has at least two ribs formed transversely at the bottom of each first and second groove, of predetermined height when the tyre is new, substantially equal to the difference between the predetermined depth of each first and second groove and the predetermined radial wear threshold, in which the distance separating the two ribs is less than a predetermined distance so that, beyond the predetermined radial wear threshold, each cavity formed by each first and second groove and delimited by the two ribs produces sound.

In the state of the art, the visual wear indicators are also formed by ribs provided at the bottom of circumferential grooves of the tyre. However, these visual wear indicators are arranged so that the ribs are very far apart from one another. Thus, the distance separating two adjacent ribs is much greater than the length of the area of contact of the tyre with the ground, and at no time are two adjacent ribs simultaneously in contact with the ground. Thus, in the state of the art, the volume defined by the groove and delimited by two adjacent ribs does indeed form a cavity but this cavity is not a sound cavity because it is not able to be sealed in a substantially leaktight manner by the ground.

The acoustic sensor belongs to a telephone mounted in the passenger compartment of the vehicle. This telephone may be, for example, a telephone fixedly mounted in the passenger compartment of the vehicle or else a mobile telephone belonging to one of the occupants of the vehicle. This solution is particularly advantageous because it reduces the number of devices present in the vehicle by reusing devices that are already inside. Furthermore, a telephone comprises means of outside communication which facilitates the emission of data to the remote server.

The acoustic sensor belongs to an electronic module mounted in the vehicle, for example a geolocation electronic module.

The method also comprises a pre-processing of the acoustic signal intended to extract therefrom the acoustic footprint noise. Given that the acoustic signal may vary according to the wear or the pressure of the tyre, the pre-processing makes it possible to interpret this signal to estimate the level of wear of the tyre and thus qualify its condition by means of the acoustic footprint noise.

In one embodiment, the pre-processing is implemented by a system mounted on the motor vehicle, before the emission step.

In another embodiment, the pre-processing is implemented by the remote server after the emission step.

Preferably, the acoustic footprint noise comprising several individual acoustic footprint frequency components and the acoustic signal comprising several individual frequency components, in which method, during the pre-processing:

several series of individual frequency components are enumerated, each enumerated series being able to form at least one part of the individual acoustic footprint frequency components;

a series, called acoustic footprint series, is selected from the enumerated series;

a so-called local reliability index is determined from the acoustic footprint series.

The method according to the invention makes it possible to alert a user of the tyre without necessarily knowing parameters such as the speed of the vehicle, the geometry of layout of the sound wear indicators and their number. In practice, the individual frequency components of the acoustic footprint noise are characteristic of the noise emitted by the indicators. Thus, when the radial wear threshold of the tyre is exceeded, the acoustic footprint noise emitted by the indicators comprises several individual frequency components distributed in frequency according to the parameters. This distribution in frequency conforms to a predetermined pattern. This pattern is defined by spacing ratios between the various individual signals.

Thus, by enumerating several series consisting of individual frequency components acquired and able to form at least one part of the individual acoustic footprint frequency components, that is to say conforming to the predetermined pattern, series of individual frequency components are enumerated that are each able to be characteristic of the noise emitted by the set of sound wear indicators. Since the acoustic footprint noise is unique and exhibits noteworthy and distinctive characteristics by virtue of its predetermined pattern, the acoustic footprint series can be selected from the series enumerated by means of predetermined criteria.

The method also comprises a post-processing during which the remote server establishes a diagnosis of the condition of the tyre and its past trend over time according to the result of the pre-processing. For this, the server may comprise means for storing past conditions. The diagnosis notably makes it possible to estimate the remaining life of the tyre or the type of use of the latter according to the driver's driving style.

In one embodiment:

several acoustic signals that are successive in time and able to comprise the acoustic footprint noise are acquired, each acoustic signal comprising several individual frequency components, for each acoustic signal, an acoustic footprint series is selected and a local reliability index is determined for the selected acoustic footprint series, and during the post-processing:

a so-called global reliability index is determined on the basis of the local reliability indices of the acoustic footprint series, if the global reliability index is, as an absolute value, greater than or less than a predetermined threshold associated with this global reliability index, an alert concerning the wear of the tyre is emitted.

The amplitude of the noise emitted by the assembly in the frequency domain depends notably on the surface on which the tyre is running. For example, a relatively smooth ground is more favourable to the emission of the noise from the indicators than a porous ground. However, the detection remains possible in both cases. There are therefore surfaces favourable to the detection and others less favourable, these two types of surfaces possibly following one another randomly. Thus, a first local index may, for a first acoustic signal, be greater than the threshold associated with the local index, then a second local index may, for a second acoustic signal, subsequent to the first, be less than said threshold. In this case, it is impossible to tell whether the radial wear threshold has actually been crossed and whether the second index is below the threshold because of an unfavourable surface or whether the radial wear threshold has not been crossed and whether the first index wrongly indicates it.

In order to reduce this risk of a wrong alert and to make the detection method more robust, several temporally successive acoustic signals are processed. If several acoustic footprint series of successive acoustic signals exhibit a local reliability index indicating that the radial wear threshold has been exceeded, there is a great probability that the radial wear threshold has actually been crossed which is indicated by the global reliability index.

In another embodiment:
several acoustic signals that are successive in time and able to comprise the acoustic footprint noise are acquired, each acoustic signal comprising several individual frequency components,
for each acoustic signal, an acoustic footprint series is selected, and
during the post-processing:
a so-called global reliability index is determined from a continuity in time between the individual frequency components of each selected acoustic footprint series,
if the global reliability index is, as an absolute value, greater than or less than a predetermined threshold associated with this global reliability index, an alert concerning the wear of the tyre is emitted.

In this embodiment, the risk of a wrong alert is also reduced. The global reliability index is determined on the basis of the graphic representation, independent of the local reliability indices, unlike the previous embodiment in which the global reliability index is dependent on the local reliability indices. Thus, there is an assurance that the wear of the tyre is correctly detected by means of local and global reliability indices that are unrelated to one another which makes the method more robust.

This method makes it possible to monitor the tyres of a plurality of motor vehicles, in which a diagnosis is established for all the tyres of the plurality of vehicles. In practice, this method can be implemented advantageously by a vehicle rental agency which can then monitor the condition of the tyres of all its fleet of vehicles. By virtue of the remote transmission of the condition of the tyres, the rental agent has no need to go and look at each of the vehicles. The role of the remote server is to centralize all this information.

The remote server, according to the diagnosis, transmits to the user a tyre usage recommendation. This usage recommendation may relate to the speed or the remaining distance to be travelled before changing one or more of the tyres. The system may also recommend that the driver immediately change his tyres.

The recommendation is transmitted by SMS or electronic message to the user. This is notably advantageous when the acoustic condition signal for the assembly is detected using the driver's mobile telephone. This recommendation may also be transmitted by any other information means such as a telephone, a pocket organizer, a terminal, portable or otherwise, etc.

The subject of the invention is also a computer program comprising code instructions capable of running the execution of the steps of the method as defined above when executed on a computer.

The invention also relates to a data storage medium comprising, in stored form, a program as defined above.

The subject of the invention is also a provision of a program as defined above on a telecommunication network in order for it to be downloaded.

BRIEF DESCRIPTION OF THE DRAWINGS

The invention will be better understood from reading the following description, given solely as an example, and by referring to the appended figures in which:

FIGS. 8 to 12 illustrate acoustic signals of the acoustic signal detected inside a passenger compartment of a vehicle with the tyres of FIG. 3;

DETAILED DESCRIPTION OF THE INVENTION

Figure 1:
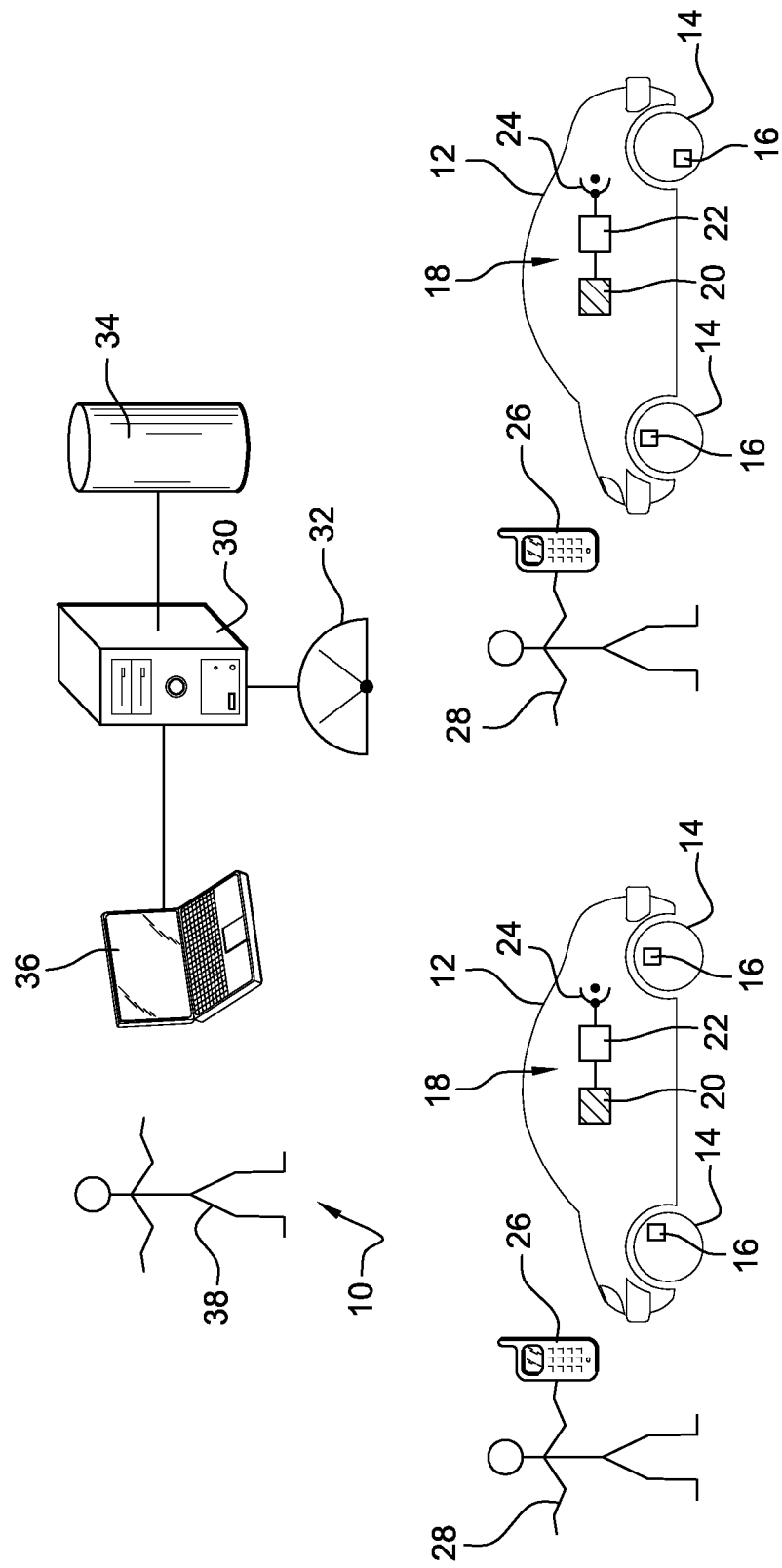
FIG. 1 is a diagram of an installation suitable for implementing the monitoring method according to the invention.

FIG. 1 shows an installation designated by the general reference 10 suitable for implementing a method according to the invention for monitoring tyres of motor vehicles 12.

In FIG. 1, the motor vehicles 12 are cars. The invention can also be implemented on any type of motor vehicle provided with tyres, such as heavy goods vehicles.

Each car 12 comprises tyres 14 whose condition has to be monitored. The condition of the tyre characterizes, for example, its wear or its pressure.

For this, each tyre 14 is provided with sound condition indicators 16, that is to say indicators 16 capable of emitting an acoustic footprint noise which varies according to the condition of the tyre, notably according to its wear.

The vehicle 12 also comprises, within its passenger compartment, a system 18 for detecting an acoustic signal comprising the acoustic footprint noise produced by all of the indicators 16 beyond a predetermined radial wear threshold. The system 18 comprises an acoustic sensor such as a microphone 20, means 22 for processing the signal detected by the acoustic sensor 20, and means 24 for emitting the results of the remote processing.

The system 18 may be a system fixedly mounted in the vehicle 12, notably in its passenger compartment. The system may thus be a fixed telephone whose acoustic sensor 20 is fixed on a windscreen upright, close to the mouth of the driver and whose processing means 22 are incorporated in the vehicle's computer. This system may also take the form of an electronic module of GPS geolocation, personal digital assistant, emergency call system, or other such type. In this case, the acoustic sensor 20 may be incorporated in the module or external and connected to the processing means 22 of the module.

The system 18 may also be a mobile system which is not mounted permanently in the passenger compartment of the vehicle 12, for example a mobile telephone 26 of the driver 28. In this case, the acoustic sensor 20, the processing means 22 and the emission means 24 are incorporated within the mobile telephone 26 itself.

In FIG. 1, the mobile telephone 26 of the driver 28 is represented as distinct from the system 18. As indicated previously, these two systems may be merged.

The installation 10 also comprises a remote server 30 to which are linked remote data emission and reception means 32, a database 34 and a command and control terminal 36 that can be accessed by a user 38.

The server 30 is capable of interacting with the monitoring systems 18 incorporated in the vehicles 12 by virtue of the cooperation of the emission means 24 with the emission and reception means 32.

Figure 2:
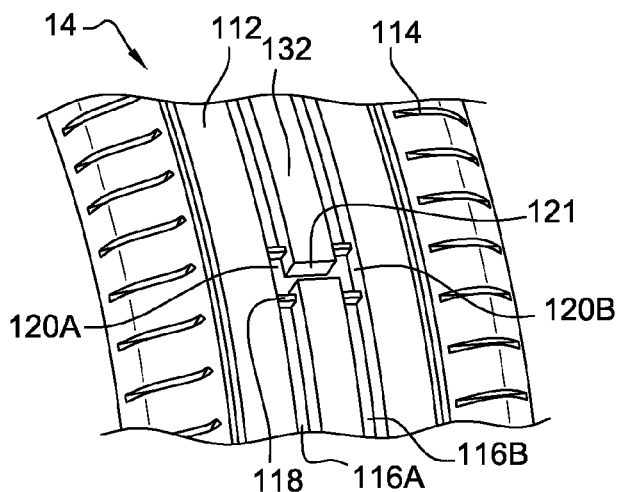
FIG. 2 is a diagram of the tyre tread of a new tyre.

FIG. 2 shows a part of the tyre 14 in new condition.

The tyre 14 comprises a tyre tread 112 of substantially cylindrical shape, the outer surface of which is provided with a tread pattern 114. In particular, the tyre tread 112 comprises first and second grooves 116A, 116B which are circumferential and parallel, hollowed out of the surface of the tyre, of predetermined depth when the tyre 14 is new. For example, the depth of these grooves is of the order of 8 millimeters for a private passenger vehicle.

Transversally to the grooves 116A, 116B, the tyre tread 112 of the tyre comprises a set of ribs 118 formed at the bottom of the grooves 116A, 116B, the height of the ribs 118 being predetermined when the tyre is new. For example, the height of these ribs is of the order of 3 millimeters. In the example represented in FIG. 2, the ribs 118 are evenly distributed all along the circumference of the tyre 14, the distance between two adjacent ribs being of the order of 20 to 30 millimeters.

The tyre tread 112 also comprises a pair of first and second cavities 120A, 120B respectively arranged in the first and second grooves 116A, 116B, and a transversal channel 121 associated with the pair of cavities 120A, 120B. The channel 121 is formed in the tread 112 and links the cavities 120A, 120B together. The cavities 120A, 120B are axially aligned. As a variant, they are axially offset relative to one another.

The volume defined by each groove 116A, 116B and two adjacent ribs 118 respectively forms each cavity 120A, 120B opening out radially towards the outside of the tyre 14. The channel 121 also opens out towards the outside of the tyre 14.

When the tyre is new, as is represented in FIG. 2, the height of the ribs 118 is smaller than the depth of the grooves 116 so that two adjacent cavities 120A, 120B include a fluidic communication passage situated above the ribs 118, that is to say at the top of the ribs 118. Thus, even when the tyre tread is in contact with a flat and smooth ground 111, the ground 111 does not completely block the cavities 120A, 120B because the top of the ribs is not in contact with the ground 111. In this case, the various adjacent cavities 120A, 120B are in fluidic communication with one another via a throat channel delimited by the top of the ribs and the ground 111 covering the cavities, or else by the channel 121.

Figure 3:
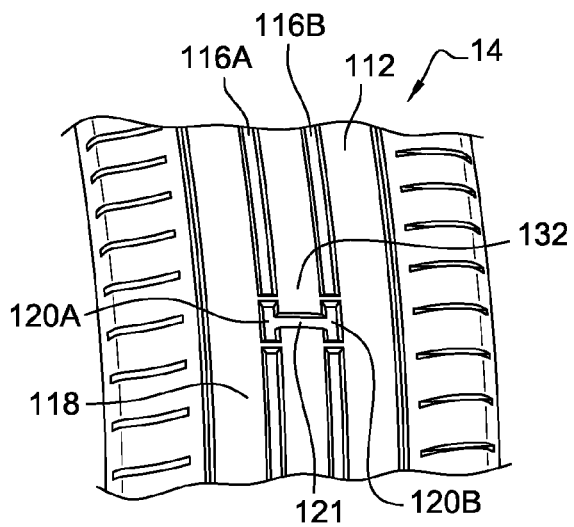
FIG. 3 is a diagram of the tyre tread of the tyre represented in FIG. 2, in a worn condition.

FIG. 3 shows the tyre 14 of FIG. 2 in a worn condition. In other words, it is a tyre that has travelled many kilometers and whose tyre tread 112 has been progressively worn until a few millimeters, around 5 mm, have been lost.

In the case in point, the wear of the tyre tread 112 of the tyre 14 represented in FIG. 3 is of the order of 6 mm, that is to say greater than the distance between, when the tyre is new, the top of the ribs 118 and the surface of the tyre tread. Given this pronounced wear, the top of the ribs 118 is at the same level as the surface of the tyre tread 112. Thus, the mouth of each cavity 120A, 120B and of the channel 121 is defined by a substantially flat contour formed on the tyre tread. Each pair of cavities 120A, 120B and the channel 121 associated therewith are distinct and separated from one another.

Each cavity 120A, 120B has a length of the order of 20 to 30 millimeters, corresponding to the circumferential difference between two adjacent ribs 118 and a depth of the order of 2 millimeters, less than or equal to the initial height of the rib 118.

Each pair of cavities 120A, 120B and the associated channel 121 forms one of the sound wear indicators 16. The tyre 14 includes a set of eight indicators 16, that is to say a set of eight pairs of sound cavities 120A, 120B and eight associated transversal channels 121 evenly distributed along the circumference of the tyre 14. Thus, the indicators 16 are evenly distributed circumferentially in the tyre tread 112. The pairs of cavities 120A, 120B and the channels 121 have identical shapes.

Beyond the predetermined radial wear threshold, the total volume of the pairs of sound cavities 120A, 120B and of the associated sound channels 121 is greater than or equal to 4 $cm^3$, preferably 5 $cm^3$.

Because the mouth of each cavity 120A, 120B and of the channel 121 is defined by a substantially flat contour, it is capable of being perfectly and hermetically sealed by a smooth and flat ground when running. In other words, when the tyre 14 is worn, the cavities 120A, 120B and the channel 121 are configured so as to be sealed by the ground in a substantially leaktight manner when they pass into the area of contact of the tyre 14 with the ground.

Such cavities 120A, 120B and such an associated channel 121 which are formed on the surface of the tyre tread 14 of a tyre which, on the one hand, open out radially towards the outside of the tyre and, on the other hand, are configured to be sealed hermetically when they pass into the area of contact, are qualified as "sound" cavities and channels.

Various cavity sizes or various orientations of these cavities 120A, 120B and of the associated channels 121 relative to the tyre tread can be envisaged.

In the tyre 14, such sound cavities appear only when the tyre is worn beyond a predetermined radial wear threshold and do not exist below this threshold, notably when the tyre is new.

Figure 4:
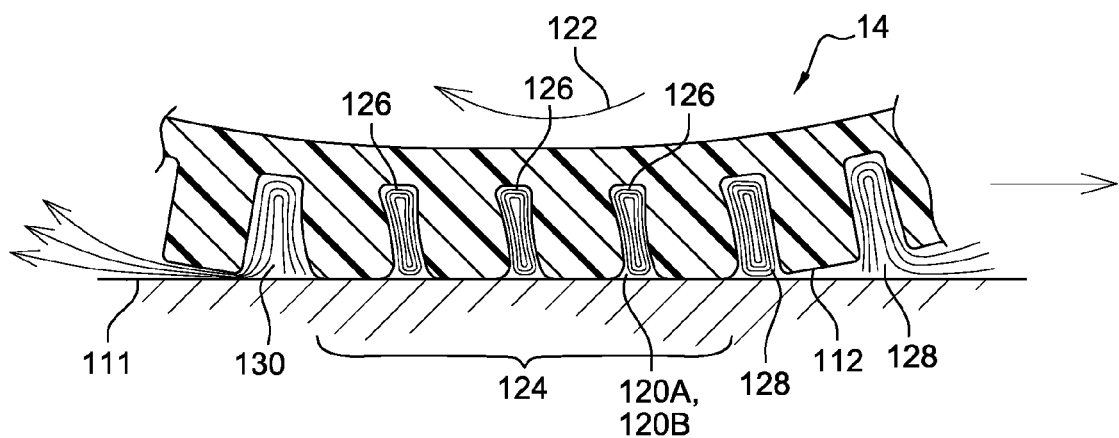
FIG. 4 is a diagram according to a radial cross section of the tyre tread of the tyre represented in FIG. 3, FIGS. 5A-5E and 6A-6E illustrate theoretical acoustic footprint noise signals emitted by sound wear indicators of the tyre of FIG. 3 and an acoustic signal comprising this acoustic footprint noise.
Figure 7:
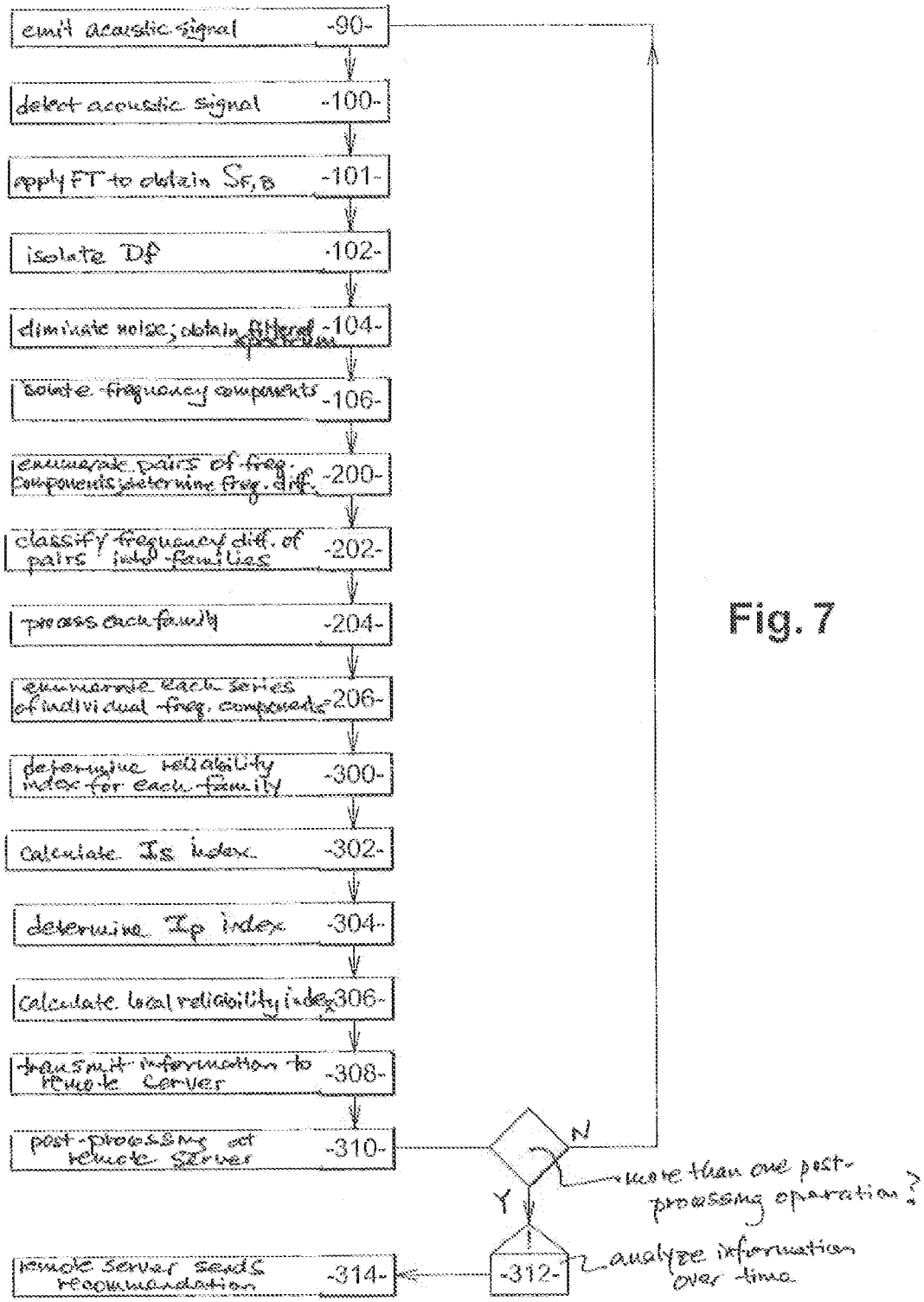
FIG. 7 is a diagram of the steps of the monitoring method according to first and second embodiments of the invention.

FIG. 4 shows a view according to a radial cross-section of a tyre similar to that of FIG. 4 when running on a ground. The dimensions are modified arbitrarily in the interests of the clarity of the explanation. This tyre 14 is in a worn condition and consequently has a set of eight sound cavities 120A, 120B and eight associated channels 121.

An arrow 122 represents the direction of rotation of the tyre 14 when running on the ground. At a given instant, a part of the tyre tread 112 of the tyre 14 is in contact with the ground. This part in contact is called area of contact 124. The cavities 120A, 120B of each pair are axially positioned in a central part 132 of the area of contact 124 of the tyre formed by a part of a circumferential tyre tread of the tyre 14.

In the example represented in FIG. 4, the area of contact 124 has three pairs of sound cavities 126 and three associated sound channels, the radially outer mouth of which is covered by the ground 111. Thus, these three pairs of sound cavities 126 and their associated sound channels are hermetically sealed.

The area of contact 112 of the tyre also includes pairs of sound cavities 128 and their associated sound channels, situated upstream of the pairs of sealed cavities 126 and their associated channels, which are open because their mouth is not in the area of contact and is consequently not covered by the ground. When the tyre is running in the direction designated by the arrow 122, the pairs of open cavities 128 and their associated channels will advance towards the area of contact 124 until their mouth is blocked by the ground 111.

Finally, the tyre tread 112 of the tyre 14 also has pairs of cavities 130 and their associated channels situated downstream of the pairs of cavities 126 and associated channels that are sealed, relative to the direction of rotation of the tyre. In the example represented in FIG. 4, the pair of cavities 130 and the associated channel downstream that are represented are open because the ground 111 is not in contact with their mouth. At a preceding instant, this pair of cavities 130 and the associated channel were sealed because they were located in the region of the area of contact 124 of the tyre with the ground 111.

Thus, while the tyre is running, a given pair of sound cavities 120 and the associated sound channel successively occupy an upstream position 128 in which they are open, then a position 126 located in the area of contact 124 in which they are sealed because they are covered by the ground, then finally an open position 130 again in which they are no longer covered by the ground.

In other words, the rotation of the tyre causes, for a given pair of cavities and an associated channel, the intake of air into the pair of cavities and the associated channel, the compression of the air contained in the pair of cavities and the associated channel when the latter are sealed by the ground in the area of contact 124, then the expansion of the air contained in the pair of cavities and the associated channel when the latter open through the separation of the tyre tread from the ground.

This succession of intake/compression/expansion steps is the source of the characteristic acoustic footprint noise, often called hiss or pumping noise, resulting from the expansion of the compressed air contained in the pair of cavities and the associated channel.

We will now explain the principle of detection of the pumping noise emitted by the sound wear indicators 16 with reference to FIGS. 5A-E and 6A-E. These figures illustrate the theoretical pumping noise of the worn passenger vehicle tyre of FIG. 3 running at a substantially constant speed of 90 km/h.

FIGS. 5A-5C illustrate theoretical signals in the time domain and FIGS. 6A-6C illustrate theoretical signals in the frequency domain that are obtained respectively from each signal 5A-5C by Fourier transform.

FIG. 5A illustrates a time signal $S_{T,U}$, called pulse, which is unitary, from a indicator 16. This pulse represents the amplitude (in Pa) of the noise emitted by the indicator 16 and takes the form of a damped sinusoid having a specific frequency $f_0$, a maximum amplitude $a_0$ and a characteristic damping time $t_0$. In the case in point, $f_0=1200$ Hz, $a_0=0.044$ Pa and $t_0=0.001$ s.

The unitary frequency signal $S_{F,U}$ of FIG. 6A takes the form of a Gaussian centred on the specific frequency $f_0$. It will be noted that, the shorter the unitary pulse, the less the sinusoid oscillates and the wider the frequency spectrum. Conversely, the longer the unitary pulse, the more the sinusoid oscillates and the narrower the frequency spectrum. Thus, for a perfect non-damped sinusoid, the Fourier transform of FIG. 5A would take the form of a Dirac spike of frequency $f_0$.

FIG. 5B illustrates a scrunning time signal $S_{T,D}$ from the indicators 16 of the tyre of FIG. 3. Since the tyre has eight indicators 16, the scrunning time signal takes the form of a Dirac comb of period $T_{TUS}=0.019$ s and of amplitude 1 comprising several spikes corresponding to the passage of each indicator 16 into the area of contact.

The scrunning frequency signal $S_{F,D}$ also takes the form of a Dirac comb characterized by equidistant individual frequency components, spaced apart by a pitch $F_{TUS}=1/T_{TUS}$ and of amplitude $F_{TUS}=1/T_{TUS}=52.2$. It is noted that the amplitude of the frequency signal $S_{F,D}$ is very much greater than the amplitude of the time signal $S_{T,D}$.

FIG. 5C illustrates a total time signal $S_{T,T}$ from the indicators 16 corresponding to the convolutional product of the unitary time signal $S_{T,U}$ of FIG. 5A and of the scrunning time signal $S_{T,D}$ of FIG. 5B. The total time signal $S_{T,T}$ therefore takes the form of a succession of damped sinusoids of maximum amplitude substantially equal to 0.044 Pa.

The total frequency signal $S_{F,T}$ corresponds to the product of the unitary frequency signal $S_{F,U}$ of FIG. 6A and of the scrunning frequency signal $S_{F,D}$ of FIG. 6B. The total frequency signal $S_{F,T}$ therefore takes the form of a unitary frequency signal $S_{F,U}$ sampled at the frequency $F_{TUS}$ and amplified by a factor $F_{TUS}$ relative to the unitary time signal $S_{T,U}$. This amplification stems from the frequency conversion of the scrunning time signal $S_{T,U}$. In the case in point, the amplitude of the total frequency signal $S_{F,T}$ is substantially equal to 2.28 Pa.

In reality, the total signal $S_{T,T}$, $S_{F,T}$ from the indicators 16 is covered by a spurious signal B corresponding to the surrounding noise. The noise B was recorded in the passenger compartment of a BMW vehicle 318*d* running at 90 km/h fitted with standard tyres.

FIG. 5D illustrates a time signal $B_T$ corresponding to the noise measured inside the passenger compartment. The maximum amplitude of such a noise $B_T$ is substantially equal to 0.034 Pa. The maximum amplitude of the corresponding frequency signal $B_F$ as represented in FIG. 6D is substantially equal to 0.348 Pa.

FIG. 5E illustrates a total time signal STT corresponding to the superposition of the total theoretical time signal $S_{T,T}$ of FIG. 5C and of the time signal corresponding to the noise $B_T$ of FIG. 5D. The signal-to-noise ratio in the time domain is substantially equal to 1.04. FIG. 6E illustrates a total frequency signal $S_{FT}$ corresponding to the superposition of the total theoretical frequency signal $S_{F,T}$ of FIG. 6C and the frequency signal $B_F$ of FIG. 6D corresponding to the measured noise. The signal-to-noise ratio in the frequency domain is substantially equal to 13.4.

The analysis of these signals notably shows the benefit of working with signals in the frequency domain because they exhibit a higher signal-to-noise ratio than the signals in the time domain. The detection of the wear and the reliability of this detection are thus greatly enhanced.

The total frequency signal SFT of FIG. 6E exhibits several characteristics notably comprising the predetermined distribution pattern, the pitch between each spike equal to $F_{TUS}$, the maximum amplitude A of the signal and the number of individual frequency components N of the signal.

$F_{TUS}$ is a function of the speed V of the tyre 14, of the number $N_{TUS}$ of equidistant indicators 16 and of the circumference C of the tyre 14.

The maximum amplitude A is a function of the characteristic damping time $t_o$, of the total volume $V_{TUS}$ of the cavities 120A, 120B and of the associated channels 121 and of the speed V of the tyre 14. The maximum amplitude A is also a function of time signal acquisition parameters comprising a sampling frequency Fe and a time signal acquisition period T.

The number of individual frequency components N is a function of the bandwidth of the individual pulse from each indicator 16 which in turn depends on the characteristic damping time $t_o$. N also depends on the frequency $F_{TUS}$, on the interaction of the total signal from the indicators 16 and on the signal corresponding to the noise and on the frequency resolution Δf defined as the ratio of the sampling frequency Fe to the acquisition time T.

FIGS. 7 to 16 represent the various steps of a method for monitoring the condition of the tyres 14 of the vehicles 12, according to first and second embodiments of the invention.

FIG. 8 represents a raw total time signal $S_{T,B}$ of an acoustic noise measured in the passenger compartment of a BMW vehicle 318d fitted with a worn front right tyre according to FIG. 3. The acquisition parameters are T=1 s, Fe=8000 Hz. Not known however are the characteristics of the tyre 14 such as the number $N_{TUS}$ of indicators 16, the circumference C of the tyre 14, the total volume $V_{TUS}$ of the cavities 120A, 120B and of the associated channels 121, or the speed V of the vehicle.

During a first step 90, the vehicle 12 is running on a ground. The running of the tyres 14 of the vehicle 12 on the ground causes the emission of a raw acoustic time signal $S_{T,B}$ able to comprise the acoustic footprint noise $S_{F,T}$.

During a next step 100, the acoustic signal comprising the surrounding noise and able to comprise the acoustic footprint noise $S_{F,T}$ is detected by the acoustic sensor 20 of the monitoring system 18 mounted in the motor vehicle.

Then, during a pre-processing comprising the steps 101 to 306, the acoustic signal detected by the acoustic sensor 20 is processed to isolate the acoustic footprint noise produced by the set of indicators 16 and to extract a characteristic acoustic footprint therefrom. These pre-processing steps can be implemented permanently, periodically or on demand. The pre-processing is performed by the means 22 of the system 18.

In a step 101, a Fourier transform is applied to the raw total time signal $S_{T,B}$ of FIG. 8 in order to obtain a raw total frequency spectrum $S_{F,B}$ represented with a logarithmic frequency scale in FIG. 9.

During a step 102, a frequency domain Df of the raw spectrum $S_{F,B}$ is then isolated, said frequency domain being between 500 and 2500 Hz, in this case between 1000 and 2000 Hz represented with a linear frequency scale in FIG. 10.

Then, in a step 104, the noise is eliminated and the raw spectrum $S_{F,B}$ in the frequency domain Df is optionally normalized. In the case in point, a filtering curve is defined that passes through the minima of the raw spectrum $S_{F,B}$, then the filtering curve is subtracted from the raw spectrum $S_{F,B}$. The filtered spectrum represented in FIG. 11 is then obtained. A normalization can then, if necessary, be performed on this filtered spectrum.

Figure 12:
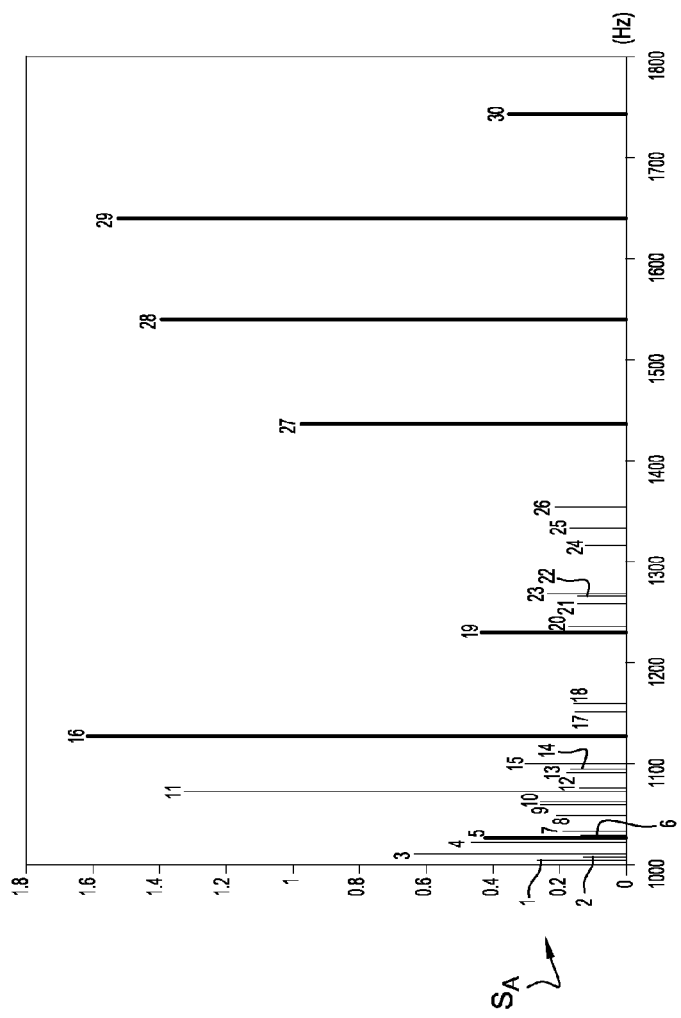
Figure 15:
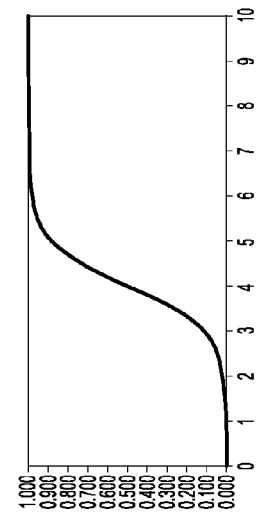
FIGS. 13 to 15 illustrate variations of relevance indices according to characteristics.
Figure 14:
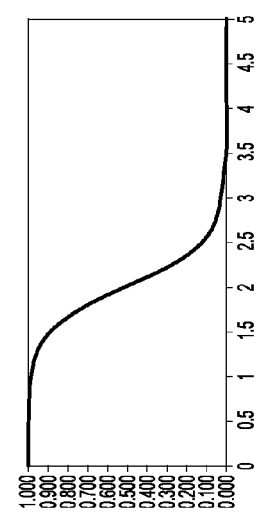
Figure 13:
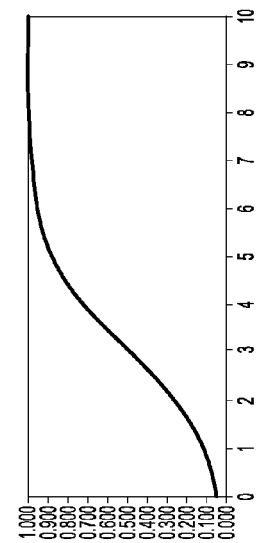
Figure 16:
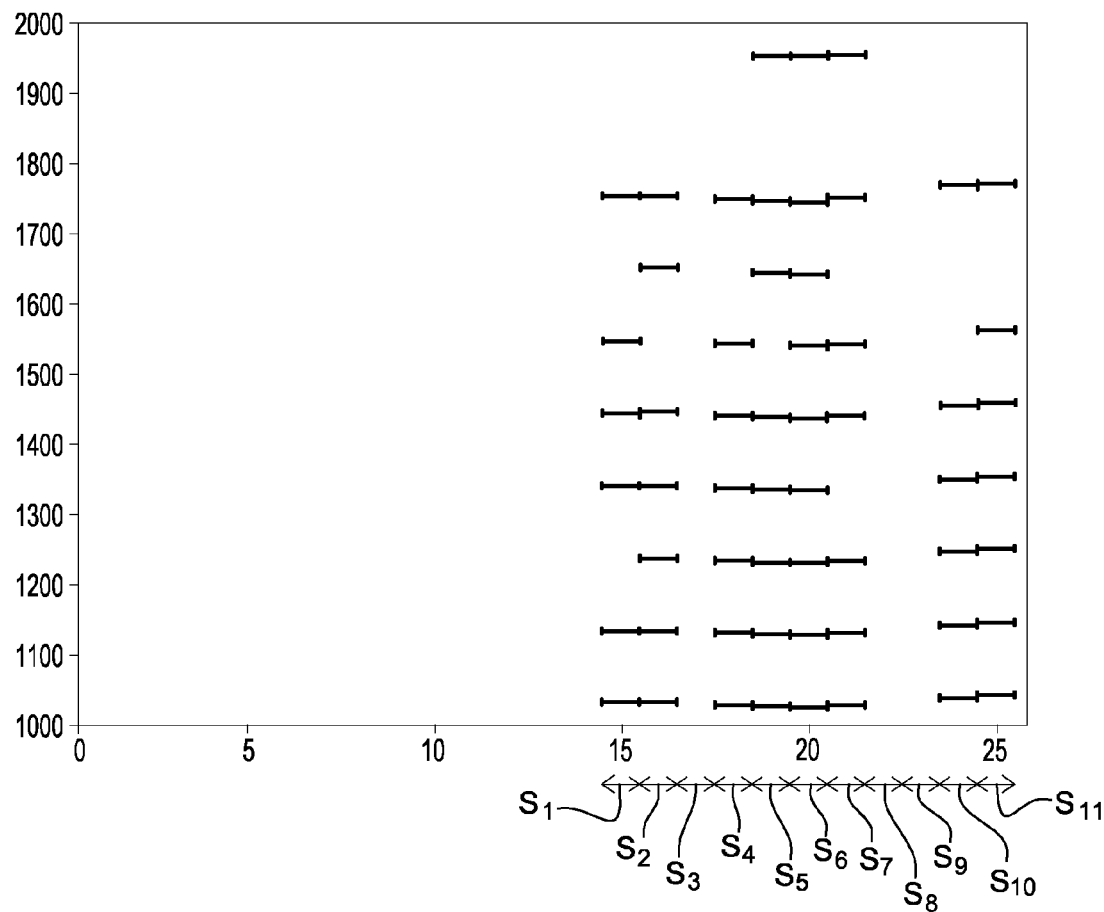
FIG. 16 illustrates several acoustic signal frames measured in succession.

Finally, in a step 106, the individual frequency components are isolated from the filtered spectrum of FIG. 11 exhibiting an intensity greater than a predetermined intensity threshold. As represented in FIG. 12, a net spectrum $S_A$ is thus obtained comprising several individual frequency components. The net spectrum or processed acoustic signal $S_A$ is therefore obtained from the raw total time signal $S_{T,B}$ that was processed. As a variant, the processing steps may not take place or else other additional filtering steps are implemented.

In the case in point, the processed acoustic signal $S_A$ comprises 30 individual frequency components, numbered from 1 to 30 in FIG. 12. If the tyre is worn, the sound cavities emit a signal similar to the theoretical signal illustrated in FIG. 6C. In order to determine whether the tyre is worn, that is to say whether the indicators 16 are emitting the pumping noise, it is therefore of use to determine whether the signal $S_A$ includes a signal similar to the theoretical signal $S_{F,T}$ emitted by the indicators 16.

It has been seen that the unavailable characteristics define a reference frequency interval I to which the frequency $F_{TUS}$ is able to belong. For a range of passenger vehicle tyres, the circumference of which can vary between 1.3 m and 3 m, and for which the number of indicators may vary between 1 and 10 and for which the speed of the vehicle may vary between 10 km/h and 130 km/h, the frequency $F_{TUS}$ may vary within the interval I between 1 and 278 Hz. For heavyweight-type tyres, the interval I is similar.

Referring to FIG. 12, in a step 200, all the pairs of individual frequency components of the processed acoustic signal $S_A$ are enumerated and a frequency difference separating the signals of each pair from one another is determined. For 30 individual frequency components, 435 possible pairs are then obtained. Only the pairs for which the frequency difference separating them belongs to the interval I are retained. Thus, only 317 pairs exhibit a frequency difference within the interval 1-278 Hz. As an example, Table 1 below shows 40 pairs of individual frequency components out of the 317 together with the corresponding frequency differences.

TABLE 1

Example of individual frequency component pairs and corresponding frequency differences

| Start frequency component number | End frequency component number | Frequency difference (Hz) | Start frequency component number | End frequency component number | Frequency difference (Hz) |
|---|---|---|---|---|---|
| 4 | 5 | 4 | 22 | 28 | 271 |
| 4 | 6 | 6 | 23 | 24 | 47 |
| 4 | 7 | 12 | 23 | 25 | 64 |
| 4 | 8 | 28 | 23 | 26 | 85 |
| 4 | 9 | 38 | 23 | 27 | 166 |
| 4 | 10 | 41 | 23 | 28 | 269 |
| 4 | 11 | 52 | 24 | 25 | 17 |
| 4 | 12 | 54 | 24 | 26 | 38 |
| 4 | 13 | 70 | 24 | 27 | 119 |
| 4 | 14 | 73 | 24 | 28 | 222 |
| 4 | 15 | 78 | 25 | 26 | 21 |
| 4 | 16 | 106 | 25 | 27 | 102 |
| 4 | 17 | 131 | 25 | 28 | 205 |
| 4 | 18 | 139 | 26 | 27 | 81 |
| 4 | 19 | 209 | 26 | 28 | 184 |
| 4 | 20 | 215 | 27 | 28 | 103 |
| 4 | 21 | 238 | 27 | 29 | 205 |
| 4 | 22 | 246 | 28 | 29 | 102 |
| 4 | 23 | 248 | 28 | 30 | 205 |
| 5 | 6 | 2 | 29 | 30 | 103 |

Then, in a step 202, each frequency difference of each pair of individual frequency components is classified in a family, called frequency difference family, defined by a family frequency difference interval $\sigma_F$. Each family frequency difference interval lies within the interval I and is determined as a function of the interval I and of a frequency resolution Δf of the acoustic signal $S_A$. In the case in point, 26 frequency difference families are defined, with their frequency difference intervals given in Table 2 below and all of which are less than or equal to 4 Hz. As a variant, all the intervals $\sigma_F$ are less than or equal to 2 Hz.

TABLE 2

Frequency difference families

| Family number | Lower limit of each family frequency difference interval $\sigma_F$ (Hz) | Upper limit of each frequency difference interval $\sigma_F$ (Hz) |
|---|---|---|
| 1 | 2 | 6 |
| 2 | 8 | 12 |
| 3 | 13 | 17 |

TABLE 2-continued

Frequency difference families

| Family number | Lower limit of each family frequency difference interval $\sigma_F$ (Hz) | Upper limit of each frequency difference interval $\sigma_F$ (Hz) |
|---|---|---|
| 4 | 18 | 22 |
| 5 | 23 | 26 |
| 6 | 28 | 32 |
| 7 | 33 | 37 |
| 8 | 38 | 42 |
| 9 | 45 | 49 |
| 10 | 50 | 54 |
| 11 | 55 | 58 |
| 12 | 61 | 65 |
| 13 | 66 | 70 |
| 14 | 76 | 80 |
| 15 | 81 | 85 |
| 16 | 86 | 90 |
| 17 | 102 | 106 |
| 18 | 115 | 119 |
| 19 | 165 | 168 |
| 20 | 202 | 206 |
| 21 | 207 | 211 |
| 22 | 225 | 229 |
| 23 | 232 | 236 |
| 24 | 238 | 242 |
| 25 | 254 | 258 |
| 26 | 260 | 263 |

Hereinbelow, we will only describe the processing of family number 17 in a step 204, the processing of the other families being deduced therefrom mutatis mutandis. Out of the 317 pairs, the pairs for which the frequency difference separating them belongs to the family frequency difference interval number 17, in this case the interval 102-106 Hz, are determined, as illustrated in Table 3.

TABLE 3

Pairs of individual frequency components of family number 17

| Start frequency component number | End frequency component number | Serial frequency difference Es (Hz) | Family number |
|---|---|---|---|
| 4 | 16 | 106 | 17 |
| 5 | 16 | 102 | 17 |
| 8 | 17 | 103 | 17 |
| 16 | 19 | 103 | 17 |
| 19 | 25 | 103 | 17 |
| 25 | 27 | 102 | 17 |
| 27 | 28 | 103 | 17 |
| 28 | 29 | 102 | 17 |
| 29 | 30 | 103 | 17 |

Then, in a step 206, all the series of individual frequency components including at least two consecutive individual frequency components separated by a frequency difference Es, called serial frequency difference, within the family frequency difference interval $\sigma_F$, are enumerated. Each enumerated series is able to form at least one part of the individual acoustic footprint frequency components. The objective here is in fact to reconstruct the Dirac comb characteristic of the total signal from the indicators 16. For family number 17, three series, grouped together in Table 4 below, are therefore enumerated. Each enumerated series comprises at least two individual frequency components spaced apart in pairs by a frequency difference within the reference frequency interval I and more specifically within the family frequency difference interval $\sigma_F$. Thus, each acoustic footprint series is able to represent a theoretical signal generated by the indicators 16 with different values of the unknown characteristics, i.e. the number $N_{TUS}$ of indicators 16, the circumference C of the tyre 14, the total volume $V_{TUS}$ of the cavities 120A, 120B and of the associated channels 121, and the speed V of the vehicle.

TABLE 4

Series enumerated in family 1

| Series number | Individual frequency components of the series |
|---|---|
| 1 | 4-16-19-25-27-28-29-30 |
| 2 | 5-16-19-25-27-28-29-30 |
| 3 | 8-17 |

Then, in a step 300, for each family, a serial reliability index Is is determined for each enumerated series as a function of first predetermined characteristics. These first predetermined characteristics comprise a dispersion $D_E$ of the frequency difference between the individual frequency components of the series, a ratio R between the acoustic signal and the noise, the number $N_S$ of individual frequency components in the series and the density D of the series, that is to say the ratio of the total number of individual frequency components to the maximum number of possible individual frequency components. In the case in point, for series number 2, $D_E=0.5$, $R=13.4$, $N_S=8$, $D=100\%$.

Then, in a step 302, the index Is is calculated as a barycentre of R, D, $N_S$ and $D_E$. The index Is of each series of each family is calculated. Then, the indices Is of each enumerated series of each family are compared. Here, the higher the index Is, the more the corresponding series is likely to represent the theoretical signal sought. The acoustic footprint series that has the highest index Is is then selected. In the case in point, series number 2 of family number 17 has the highest index Is=0.994 out of the three identified series.

As a variant, after the calculation of the index Is of each enumerated series of each family, a series is selected in each of the 26 families as a function of the first predetermined characteristics. 26 selected series are therefore obtained. Then, for each selected series in each family, a family index If is determined as a function of second predetermined characteristics of each selected series. The first and the second characteristics may be identical or different. Finally, the acoustic footprint series is selected by comparing each family index If of the 26 selected series.

Although the acoustic footprint series number 2 of family number 17 is the one that is most likely to constitute the one corresponding to the noise emitted by the indicators out of all the series enumerated, it is not impossible for the first characteristics of this series to remain insufficient to emit an alert concerning the wear of the tyre.

Thus, in a step 304, a relevance index Ip is determined for each first characteristic, in the case in point for the ratio R (FIG. 13), for the dispersion $D_E$ of the frequency difference (FIG. 14) of the number $N_S$ of individual frequency components in the series (FIG. 15) and for the density D of the series. In these figures, each relevance index is defined by a variable function of sigmoid type of each first characteristic. For example, for an acoustic footprint series having a ratio R=7, the relevance index Ip associated with N is equal to 0.98. For an acoustic footprint series having a dispersion $D_E=1.5$, the relevance index Ip associated with $D_E$ is equal to 0.9. For an acoustic footprint series comprising $N_S=4$ individual frequency components, the relevance index Ip associated with $N_S$ is equal to 0.5.

Then, in a step 306, a local reliability index Icl is calculated from the indices Ip. The index Icl is equal to the product of the indices Ip. As a variant, Icl is equal to an arithmetical or weighted average of the indices Ip.

Then, during a step 308, information relating to the acoustic signal produced by the set of indicators 16 comprising the local reliability index Icl is transmitted to the remote server 30 by virtue of the emission means 24 and the reception means 32 connected to the server 30. The server 30 is suitable for collecting information relating to the condition of the tyres from an entire fleet of vehicles, in particular from the two vehicles represented in FIG. 1.

Then, a post-processing is performed comprising a step 310 in which the server 30 processes the received information, notably the local reliability indices Id. This post-processing comprises, for example, a storage in the database 34 of the information relating to one and the same vehicle over time.

The post-processing also comprises a step 312 for analysing the different information stored over time to establish a diagnosis of the condition of the tyre according to its past trend. In practice, several successive acoustic signals are isolated in the frequency domain. For each acoustic signal, an acoustic footprint series is selected. The signals of the acoustic footprint series S1-S11 selected from the successive acoustic signals are graphically represented, as in FIG. 16, as a function of time. It will be noted that the series S3, S8 and S9 do not appear. This may be due to the spurious noises for example. The small frequency offsets from one series to another are due to the small speed variations which changes the frequency $F_{TUS}$ separating two adjacent individual frequency components of each acoustic footprint series.

A global reliability index Icg is determined from a continuity in time of the signals of the acoustic footprint series. Here, the positions of the signals of one series are compared with the signals of the next series. The graphic representation of the signals is used, for example by means of image recognition algorithms, to determine a global reliability index Icg.

In another variant, the global reliability index Icg is determined from these local indices Icl, for example by a sliding average of the last 5 local indices.

The diagnosis notably makes it possible to identify future usage recommendations for the tyres of the vehicle. These recommendations may, for example, be dependent on the driver's driving style (competitive or regular driving, etc.).

Thus, during the step 314, the remote server 30 sends a recommendation concerning the usage of the tyres of the motor vehicle, which recommendation has been determined previously, for example a limit speed not to be exceeded, an instruction to reinflate the tyres or advice to change one or more tyres. This recommendation may also include a tyre model suited to the driving of the driver. In the two variants described above, if the index Icg is above, as an absolute value, a predetermined global threshold Sg associated with this global index Icg, the server 30 emits an alert concerning the wear of the tyre 14.

This usage recommendation may, for example, be sent to the driver 28 of the motor vehicle on his mobile telephone 26 via emission means 32 linked to the server 30. Thus, the driver 28 does not have to worry about the condition of his tyres since he can be automatically warned of the actions to be taken on his tyres in good time.

The usage recommendation may also be accessible on a terminal 36 linked to the server 30 and which can be consulted by a user 38 who is not necessarily the driver of the vehicle.

The link from the terminal 36 to the server 30 may be a wired link but may also be a remote link, for example via the Internet.

The user 38 can access, via his terminal 36, the information relating to the condition of the tyres of one or more motor vehicles 12 and the usage recommendations for these tyres. Thus, the terminal 36 makes it possible to centralize the information concerning a fleet of motor vehicles, which may be particularly useful in the case of a motor vehicle rental company. The rental company can use this information to bill the driver of the vehicle according to his type of driving. In practice, the mileage information hitherto available is incomplete since it does not enable the rental company to distinguish a driver with a competitive driving style from a driver with a gentle driving style.

In a second embodiment of the method of the invention, the acoustic signal detected during the step 100 is transmitted directly to the remote server 30 which in turn carries out the pre-processing steps 101 to 306 and the post-processing steps 310-312. This second embodiment is advantageous if the processing means 22 of the mounted system 18 have limited computation capability.

Figure 18:
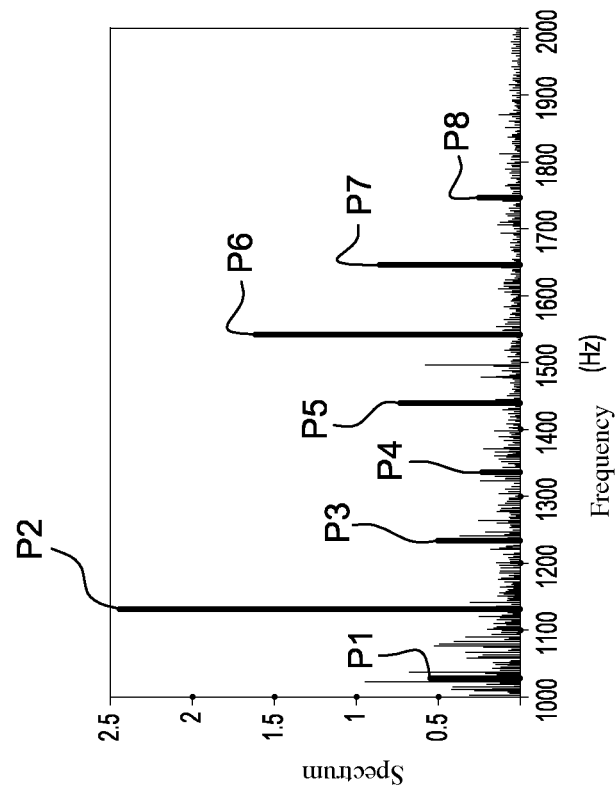
FIGS. 17 and 18 illustrate an additional step of the method according to a third embodiment of the method.
Figure 17:
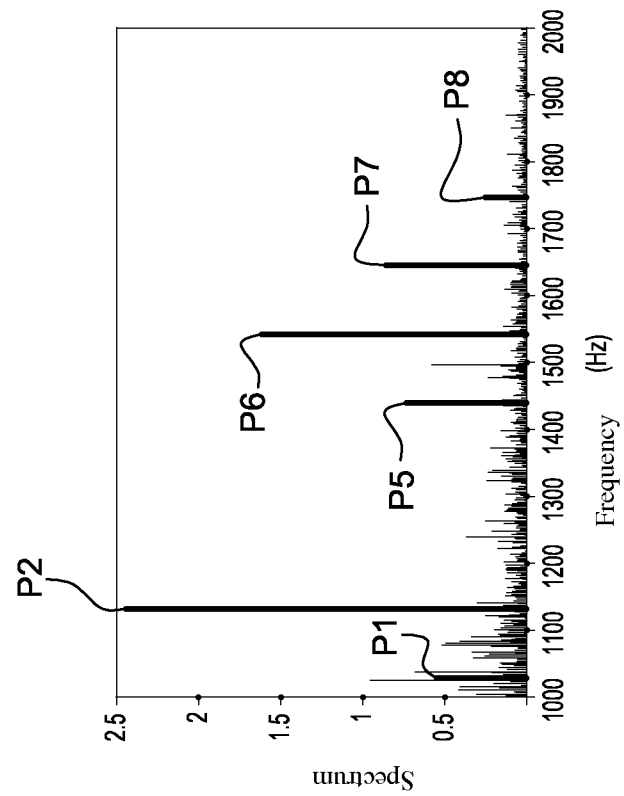

FIGS. 17 and 18 show additional steps of the monitoring method according to a third embodiment. In this third embodiment, a step for reconstructing the series is performed before the step for determining the index Is and after the step for enumeration of the series in each family. These reconstruction steps may be implemented during the pre-processing, in just the same way for both the first and second embodiments. In practice, it may be that the signals of a non-enumerated series have been corrupted, for example because of abnormal measurement conditions. Thus, a series which, in normal measurement conditions, would have been enumerated and would have included eight individual frequency components P1-P8 as represented in FIG. 18, has been split into two series respectively comprising the individual frequency components P1-P2 and the individual frequency components P5-P8 as represented in FIG. 17. The individual frequency components P3 and P4 have not been detected. In order to reconstruct the entire series, after the step for enumerating the series in each family, at least one signal is sought that is separated from one of the signals of the series by a frequency difference that is a multiple of the family frequency difference interval $\sigma_F$. It is found that the spike P5 is separated from P1 and P2 by a difference substantially equal respectively to four and three times the family frequency difference interval $\sigma_F$. Thus, the enumerated series consisting of the individual frequency components P1-P2 is complemented with the signals of the series consisting of the individual frequency components P5-P8 which are separated from one of the signals P1-P2 by a frequency difference that is a multiple of the family frequency difference $\sigma_F$.

The invention is not limited to the embodiments described above.

As it happens, the method can also be implemented by knowing all or some of the parameters of the tyre determining the frequency $F_{TUS}$. Thus, by knowing the number $N_{TUS}$ of indicators 16, notably because all the tyres with this type of indicator 16 have the same number thereof, the circumference C of the tyre 14 and the speed V of the tyre 14, for example from a GPS (global positioning system), the reference frequency interval is reduced and the robustness of the detection is enhanced. For example, by knowing the speed V=90 km/h with an accuracy of ±5 km/h of a tyre of circumference C=1.927 m having $N_{TUS}$=4, the reference frequency interval is between 49 Hz and 55 Hz. The comb is therefore all the more unique and easy to detect when the parameters of the tyre are accurately known. Furthermore, the method can be implemented with a tyre including wear indicators that do not have pairs of cavities interlinked by a transversal channel. Each wear indicator may therefore include a sound wear cavity arranged in a circumferential groove of the tyre tread, each cavity opening out radially towards the outside of the tyre and being configured so as to be sealed by the ground in a substantially leaktight manner when it passes into the area of contact of the tyre with the ground.

The invention claimed is:

1. A method for monitoring a tyre of a motor vehicle the method comprising steps of:
    detecting, by an acoustic sensor mounted on the motor vehicle, an acoustic signal that includes an acoustic footprint noise produced by a set of at least one sound wear indicator of a tyre tread of a tyre, the acoustic footprint noise being produced during running of the tyre on a ground surface beyond a predetermined radial wear threshold of the tyre tread;
    transmitting, to a remote server not mounted on the motor vehicle, information relating to the acoustic signal; and
    pre-processing the acoustic signal to extract therefrom the acoustic footprint noise,
    wherein the acoustic footprint noise includes a plurality of individual acoustic footprint frequency components,
    wherein the acoustic signal includes a plurality of individual frequency components, and
    wherein during the pre-processing step:
    more than one series of individual frequency components are enumerated, each enumerated series being able to form at least one part of the individual acoustic footprint frequency components,
    an acoustic footprint series is selected from the enumerated series, and
    a reliability index is determined from the acoustic footprint series.

2. The method according to claim 1, wherein each sound wear indicator includes a sound cavity arranged in a circumferential groove of the tyre tread, each sound cavity opening out radially towards outside of the tyre and being configured so as to be sealed by the ground surface in a leaktight manner when the sound cavity passes into an area of contact of the tyre with ground surface.

3. The method according to claim 1,
    wherein, beyond the predetermined radial wear threshold, each wear indicator includes at least one pair of first and second sound cavities and a sound channel linking each sound cavity of the pair to one another, each first and second sound cavity being respectively arranged in first and second circumferential grooves of the tyre tread, the sound channel being formed in the tyre tread, and
    wherein each sound cavity of a pair of first and second sound cavities linked by a sound channel:
    opens out radially towards outside of the tyre, and
    is configured so as to be sealed by the ground surface in a leaktight manner when the pair of first and second sound cavities passes into an area of contact of the tyre with the ground surface.

4. The method according to claim 3, wherein, as each first and second groove has a predetermined depth when the tyre is new, the tyre tread has at least two ribs formed transversely at a bottom potion of each first and second groove, of predetermined height when the tyre is new, equal to a difference between the predetermined depth of each first and second groove and the predetermined radial wear threshold, and wherein a distance separating the two ribs is less than a predetermined distance so that, beyond the predetermined radial wear threshold, each sound cavity of each first and second groove and delimited by the two ribs produces sound.

5. The method according to claim 1, wherein the acoustic sensor belongs to a telephone mounted in a passenger compartment of the motor vehicle.

6. The method according to claim 1, wherein the acoustic sensor belongs to an electronic module mounted in the motor vehicle.

7. The method according to claim 1, wherein the pre-processing step is implemented by a system mounted on the motor vehicle, before the transmitting step.

8. The method according to claim 1, wherein the pre-processing step is implemented by the remote server after the transmitting step.

9. A method for monitoring a tyre of a motor vehicle, the method comprising steps of:
    detecting, by an acoustic sensor mounted on the motor vehicle, an acoustic signal that includes an acoustic footprint noise produced by a set of at least one sound wear indicator of a tyre tread of a tyre, the acoustic footprint noise being produced during running of the tyre on a ground surface beyond a predetermined radial wear threshold of the tyre tread;
    transmitting, to a remote server not mounted on the motor vehicle, information relating to the acoustic signal;
    pre-processing the acoustic signal to extract the acoustic footprint noise; and
    post-processing during which the remote server establishes a dianosis of a condition of the tyre and a past trend of the tyre over time according to a result of the processing step.

10. The method according to claim 9, further comprising steps of:
    obtaining a plurality of acoustic signals that are successive in time and able to form the acoustic footprint noise, each acoustic signal including a plurality of individual frequency components;
    for each acoustic signal, selecting an acoustic footprint series and determining a local reliability index for the selected acoustic footprint series; and
    during the post-processing step:
    determining a global reliability index based on the local reliability indices of the acoustic footprint series, and
    if the global reliability index is, as an absolute value, greater than or less than a predetermined threshold associated with this global reliability index, emitting an alert concerning a wear condition of the tyre.

11. The method according to claim 9, further comprising steps of:
    acquiring a plurality of several acoustic signals that are successive in time and able to form the acoustic footprint noise, each acoustic signal including a plurality of individual frequency components;
    for each acoustic signal, selecting an acoustic footprint series; and
    during the post-processing step:
    determining a global reliability index from a continuity in time between the individual frequency components of each selected acoustic footprint series, and
    if the global reliability index is, as an absolute value, greater than or less than a predetermined threshold associated with the global reliability index, emitting an alert concerning a wear condition of the tyre.

12. A method according to claim 9, wherein the remote server, according to the diagnosis, transmits to a user a tyre usage recommendation.

13. The method according to claim 12, wherein the recommendation is transmitted by an SMS or an electronic message to the user.

14. A method for monitoring a trye of a motor vehicle, the method comprising steps of:
- detecting, by an acoustic sensor mounted on the motor vehicle, an acoustic signal that include an acoustic footprint noise produced by a set of at least one sound wear indicator of a tyre tread of a tyre, the acoustic footprint noise being produced during running of the tyre on a ground surface beyond a predetermined radial wear threshold of the tyre tread;
- transmitting, to a remote server not mounted on the motor vehicle, information relating to the acoustic signal;
- pre-processing the acoustic signal to extract therefrom the acoustic footprint noise; and
- post-processing during which the remote server establishes a diagnosis of a condition of the tyre and a past trend of the tyre over time according to a result of the pre-processing step,
- wherein the method is performed to monitor tyres of plurality of motor vehicles, and
- wherein a diagnosis is established for all the tyres of the plurality of vehicles.

15. A computer program product embodying computer code that, when executed by a computer, implements a method for monitoring a tyre of a motor vehicle, the tyre including a tyre tread that is configured so that, beyond a predetermined radial wear threshold, the tyre tread has a set of at least one sound wear indicator, wherein the method includes steps of:
- detecting, by an acoustic sensor mounted on the motor vehicle, an acoustic signal that includes an acoustic footprint noise produced by the set during running of the tyre on a ground surface beyond the predetermined radial wear threshold,
- emitting, to a remote server not mounted on the motor vehicle, information relating to the acoustic signal, and
- pre-processing the acoustic signal to extract the acoustic footprint noise,
- wherein the acoustic footprint noise includes a plurality acoustic footprint frequency components,
- wherein the acoustic signal includes a plurality of individual frequency components, and
- wherein, during the pre-processing step:
  - more than one series of individual frequency components are enumerated, each enumerated series being able to form at least one part of the individual acoustic footprint frequency components,
  - an acoustic footprint is selected from the enumerated series, and
  - a reliability index is determined from the acoustic footprint series.

16. A non-transitory computer-readable storage medium storing computer-executable code instructions that, when executed by a computer, implements a method for monitoring a tyre of a motor vehicle, the tyre including a tyre tread that is configured so that, beyond a predetermined radial wear threshold, the tyre tread has a set of at least one sound wear indicator, wherein the method includes steps of:
- detecting, by an acoustic sensor mounted on the motor vehicle, an acoustic signal that includes an acoustic footprint noise produced by the set during running of the tyre on a ground surface beyond the predetermined radial wear threshold,
- emitting, to a remote server not mounted on the motor vehicle, information relating to the acoustic signal, and
- pre-processing the acoustic signal to extract therefrom the acoustic footprint noise,
- wherein the acoustic footprint noise includes a plurality of individual acoustic footprint frequency components,
- wherein the acoustic signal includes a plurality of individual frequency components, and
- wherein, during the pre-processing step:
  - more than one series of individual frequency components are enumerated, each enumerated series being able to form at least one part of the individual acoustic footprint frequency components,
  - an acoustic footprint series is selected from the enumerated series, and
  - a reliability index is determined from the acoustic footprint series.

17. The non-transitory computer-readable storage medium according to claim 16, wherein the code instructions are downloadable to the storage medium via a telecommunication network.

* * * * *

UNITED STATES PATENT AND TRADEMARK OFFICE
CERTIFICATE OF CORRECTION

| | | |
|---|---|---|
| PATENT NO. | : 8,731,767 B2 | Page 1 of 1 |
| APPLICATION NO. | : 13/257023 | |
| DATED | : May 20, 2014 | |
| INVENTOR(S) | : Antoine Paturle | |

It is certified that error appears in the above-identified patent and that said Letters Patent is hereby corrected as shown below:

In the Specification

COLUMN 17

Line 1, "Furthermore," should read --¶ Futhermore,--.

In the Claims

COLUMN 17

Line 11, "vehicle" should read --vehicle,--.
Line 28, "wherein" should read --wherein,--.

COLUMN 18

Line 30, "dianosis" should read --diagnosis--.
Line 31, "processing" should read --pre-processing--.
Line 65, "A method" should read --The method--.

COLUMN 19

Line 7, "include" should read --includes--.
Line 21, "of plu-" should read --of a plu- --.
Line 41, "plurality" should read --plurality of individual--.

Signed and Sealed this
Twenty-ninth Day of September, 2015

Michelle K. Lee
*Director of the United States Patent and Trademark Office*